United States Patent Office 3,513,322
Patented May 19, 1970

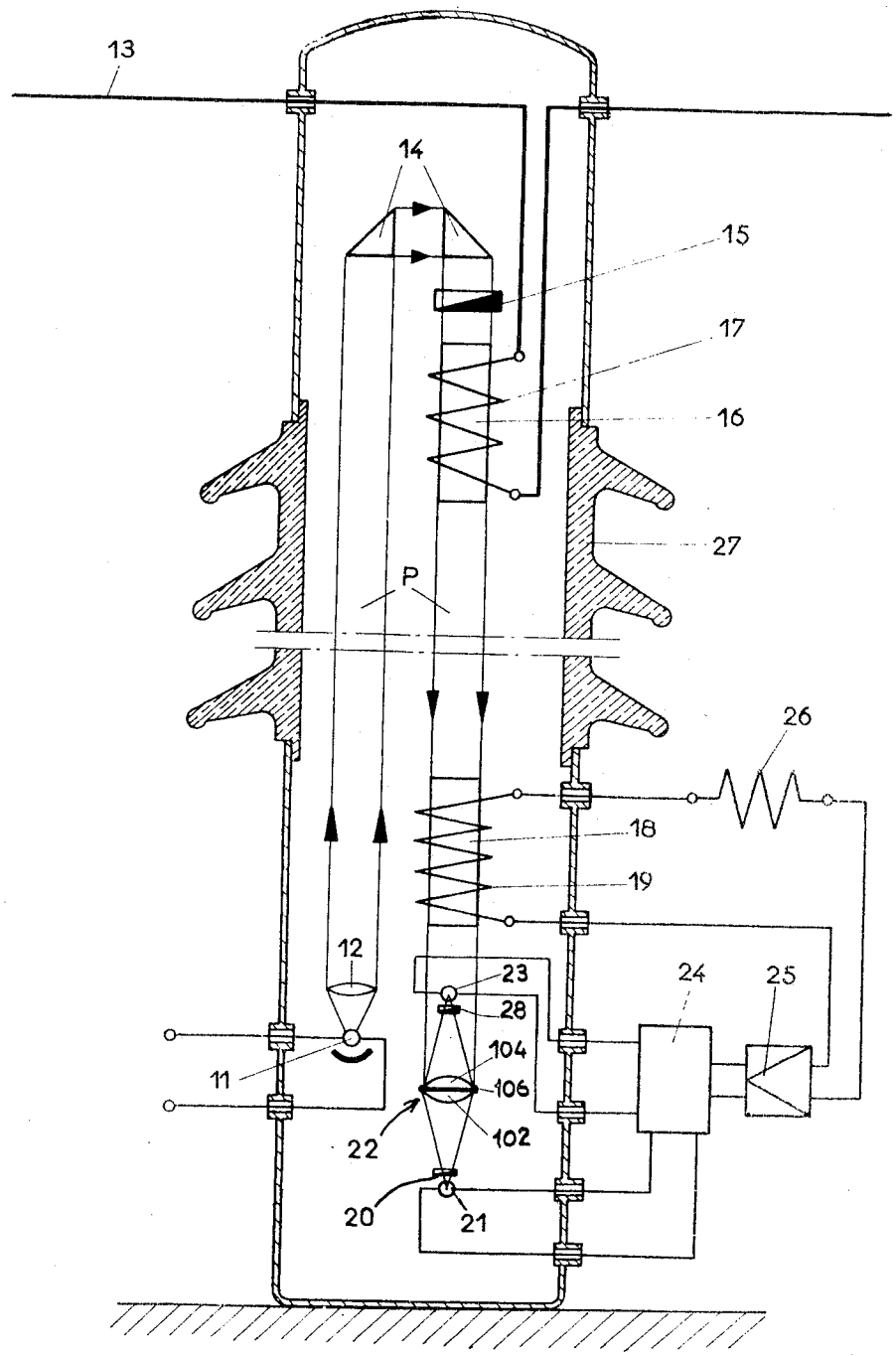

3,513,322
ELECTRO-OPTICAL MEASUREMENT DEVICE FOR AN AERIAL HIGH VOLTAGE CONDUCTOR HAVING SEMI-REFLECTING MIRROR SITUATED PERPENDICULARLY TO DIRECTION OF LIGHT BEAM
Georges Bernard, Saint-Egreve, France, assignor to Merlin Gerin, Grenoble, France
Filed May 24, 1968, Ser. No. 731,961
Claims priority, application, France, May 27, 1967, 108,156
Int. Cl. H01j 39/12
U.S. Cl. 250—220                    5 Claims

ABSTRACT OF THE DISCLOSURE

An electro-optical device for the measurement of an electrical current or voltage of an aerial high-voltage conductor comprises a system compensating the disturbances due for instance to variations in the light flux emitted by the light source. The light beam is divided into two elementary beams by a semi-reflecting plate arranged in such a way that the angle of incidence of the beam is zero, the photo-electric cells and associated analyzers, respectively collecting said elementary beams, being symmetrically located with respect to said semi-reflecting plate.

---

The present invention relates to devices for the measurement of an electrical current flowing in an aerial high-voltage conductor or of the voltage of this conductor, such devices including in the high-voltage zone means to cause the angular rotation of the plane of the polarization of a flux of polarized light under the influence of a magnetic or electrical field created by the current or voltage to be measured and including in the low-voltage zone means to measure said angular rotation. In order that the result be not affected by disturbances due for instance to variations in the light flux produced by the source, the polarized light beam is divided by a semi-reflecting plate into two elementary light beams illuminating respectively two photo-electric cells which form a part of a balanced compensating system.

Such a device for the measurement of an electrical current is given in the United States patent application No. 541,629 filed Apr. 11, 1966, and a device for the measurement of the voltage is for instance described in the United States patent application No. 622,276 filed Mar. 10, 1967 of the applicant.

The applicant has now ascertained that in the devices of the prior art the deflected elementary light beam, reflected by the semi-reflecting plate, and the transmitted elementary light beam, which traverses the semi-reflecting plate, are affected by erratic interference. For instance the characteristics of reflection are function of the angle of incidence of the light beam and not parallel beams are differently reflected introducing errors into the measuring result. The effects of this asymmetrical disposition and different ways of the elementary beams are undesirable influences on the measurement.

The object of the present invention is to remedy to such a drawback by an arrangement according which the semi-reflecting plate is disposed to receive the polarized light beam at an angle of incidence of zero, the photoelectric cells and analyzers, receiving the elementary beams, being preferably symmetrically located with respect to said semi-reflecting plate.

The semi-reflecting device comprises advantageously a semi-reflecting layer interposed between two joined lenses.

An embodiment of the invention will be hereinafter given by way of example, with reference to the accompanying drawing showing diagrammatically the incorporation of the present invention in the device described in the said United States patent application No. 541,629.

A light source 11 emits a visible, infrared or ultra-violet beam. The source is preferably located at the side at which the measurement is made at a potential equal to, or near that of earth. The transmitted beam P passes through an optical system 12 towards a high-voltage conductor 13, the current of which is to be measured. A system of prisms 14 deflects the beam towards a polarizer 15 which may also be mounted between the lens 12 and the prisms 14. The polarized beam passes then through a transparent magneto-optically active body 16 located in an axial magnetic field created by a coil 17 carrying a current $i_1$, flowing in the conductor 13, or a proportional current. Under the action of the magnetic field, the plane of polarization undergoes, inside the body 16, which has a high Verdet's constant and which may be, for example, a heavy flint, an angular rotation which is proportional to the intensity of the magnetic field produced by the current which is proportional or equal to that flowing in the conductor 13. This effect is known as magnetic rotary polarization or Faraday effect.

At a potential near earth, this rotation is measured by a compensating or zero method. The beam coming from the magnetic rotation device of the polarization plane 16 passes through a second magnetic rotation device 18 for the plane of polarization, similar to the device 16, and placed in the magnetic field created by a coil 19 whose direction is parallel to that of the light rays. The compensating method is based on the fact that, if the two rotations are equal and in opposite directions, the emerging beam is polarized in the same plane as the beam entering the first rotating device 16 and the secondary current in the coil 19 is therefore proportional to the current flowing in the conductor 13. The operation is similar to the functioning of a conventional transformer. The light flux is comparable to the magnetic flux of an electromagnetic transformer, the coil 17 presents the primary ampere-turns and the coil 19 the secondary ampere-turns. Any difference, however small, between the primary and secondary ampere-turns results in a slight rotation of the plane of polarization of the beam emerging from the rotating device 18, in one direction or the other relative to the initial orientation. This rotation is detected by an analyzer 20 followed by a photo-electric cell 21, an optical system 102 focussing the beam. A semi-reflecting or light dividing plate 22 reflects a part of the beam towards a second photo-electric cell 23. The measured difference between the signals emitted by the cells 21 and 23, illuminated, respectively, by the partial beams transmitted and reflected by the plate, is elaborated in balancing device 24 and supplies a secondary signal. This signal is electronically amplified in 25 and produces a current $i_2$ which supplies the coil 19 and an external load 26 formed by the measuring apparatus, counters or relays. The operation is such that the amplifier 25 acts on the secondary current $i_2$ in such a way that the difference between the primary and secondary ampere-turns has always the tendency to become zero.

The optical assembly will be preferably located inside a protecting chamber whose centre portion 27 is insulated.

Preferably, a second analyzer 28 will be located between the plate 22 and the cell 23, whereby the sensitivity can be doubled.

According to the present invention the semi-reflecting or light dividing plate 22 is disposed to receive the polarized light beam 14 at an angle of incidence of zero and lenses 102, 104 focus respectively the reflected and transmitted elementary light beams on the cells 21, 23. The semi-reflecting plate 22 may be a plate with a metallic layer 106 provided by metalization, or a layer directly put on the plane surface of the lens 102 or 104, interposed between the lenses 102, 104.

The cells 21, 23 are located respectively behind analyzers 20, 28 the axes of polarization of which being approximately symmetrically to the middle plane of polarization of the incident light beam.

By arranging the lenses 102, 104, the analyzers 20, 28 and the cells 21, 23 symmetrically with respect to the semi-reflecting surface 106 the effects of undesirable influences are completely eliminated.

The compensating system according to the present invention, more particularly described in connection with a current measuring device may be of course used with the same effects in voltage dividers for instance described in United States patent application No. 622,276.

What is claimed is:

1. A device for the measurement of an electrical value of a high-voltage conductor, in combination, a light source emitting a light beam, polarizing means to polarize said light beam, means traversed by said light beam to cause a first angular rotation of the plane of polarization of said light beam under the influence of said electrical value, compensating means to produce a second compensating angular rotation in opposite direction of the plane of polarization of the light beam emerging from said means causing said first angular rotation, a semi-reflecting device disposed to receive the light beam emerging from said compensating means at an angle of incidence of substantially 0° to divide said light beam into a transmitted elementary light beam and a reflected elementary light beam, a first photo-electric device collecting the light flux of the transmitted elementary light beam, a second photo-electric device collecting the light flux of the reflected elementary light beam, at least one analyzer traversed by one of said elementary light beams, an electronic balancing device, said first and second photo-electric devices being electrically connected in opposition and to said balancing device, the output of said balancing device being connected to said compensating means to excite said compensating means.

2. A device as set forth in claim 1, further comprising an optical device to focus at least one of said elementary light beams on its photo-electric device.

3. A device as set forth in claim 2, comprising two analyzers, one for each photo-electric device, said analyzers and photo-electric devices being symmetrically disposed with respect to said semi-reflecting device.

4. A device as set forth in claim 2, in which said optical device comprises a lens having a plane surface coated with a semi-reflecting layer.

5. A device as set forth in claim 4, in which said optical device comprises two plane-convex lenses sealed back to back whereby said semi-reflecting layer is interposed between the plane surfaces of said lenses.

References Cited

UNITED STATES PATENTS 3,419,802    12/1968    Pelenc et al. _____ 324—96

RALPH G. NILSON, Primary Examiner

M. ABRAMSON, Assistant Examiner